United States Patent [19]
Ebata

[11] Patent Number: 4,737,866
[45] Date of Patent: Apr. 12, 1988

[54] APPARATUS FOR REPRODUCING A DIGITAL SIGNAL

[75] Inventor: Kazuyoshi Ebata, Tokyo, Japan

[73] Assignee: Sony Corporation, Tokyo, Japan

[21] Appl. No.: 855,075

[22] Filed: Apr. 22, 1986

[30] Foreign Application Priority Data

Apr. 22, 1985 [JP] Japan ................................. 60-85863
Apr. 30, 1985 [JP] Japan ................................. 60-92806

[51] Int. Cl.⁴ ........................ G11B 5/09; H03D 3/24
[52] U.S. Cl. ...................................... 360/51; 375/120
[58] Field of Search ........................... 360/51; 369/59; 375/120, 108

[56] References Cited

U.S. PATENT DOCUMENTS

| 3,328,521 | 6/1967 | Moskovitz | 178/6.6 |
| 3,528,026 | 9/1970 | Groendycke | 375/120 |
| 3,908,115 | 9/1975 | Waggener | 235/152 |
| 4,137,504 | 1/1979 | Simmons | 328/165 |
| 4,371,975 | 2/1983 | Dugan | 360/51 |
| 4,466,110 | 8/1984 | Kizaki et al. | 375/108 |
| 4,561,101 | 12/1985 | Pinsard et al. | 375/120 |
| 4,607,729 | 8/1986 | Smidth | 360/51 |

FOREIGN PATENT DOCUMENTS 0092403 10/1983 European Pat. Off. .
2951022 7/1981 Fed. Rep. of Germany .
195311 of 1982 Japan .
182938 of 1983 Japan .
218006 of 1983 Japan .
29114 of 1983 Japan .
236167 of 1985 Japan .

OTHER PUBLICATIONS

"Read Data Gate Generator", by C. Hollstein, Jr., IBM TDB, vol. 12, #12, 5/70.
"RCA Solid State Europe Databook Series", (SSD 202), pp. 233–248, 1972.
"Achieving Fast Sync with Minimum Transient for a Particular Phase Discriminator"—by D. Malone, IBM TDB, vol. 16, #9, 2/74.

Primary Examiner—Vincent P. Canney
Attorney, Agent, or Firm—Hill, Van Santen, Steadman & Simpson

[57] ABSTRACT

Apparatus for reproducing digital signals which includes a phase locked loop circuit for generating a clock signal from a reproduced signal. The level of the reproduced signal is detected and the feedback loop of the phase locked looped circuit is controlled by the detected output such that when the reproduced signal is intermittently supplied to the phase locked loop circuit and has a burst-shape the oscillator within the phase locked loop circuit stably oscillates.

8 Claims, 10 Drawing Sheets

Not Locked   Locked   Not Locked

Not Locked   Locked

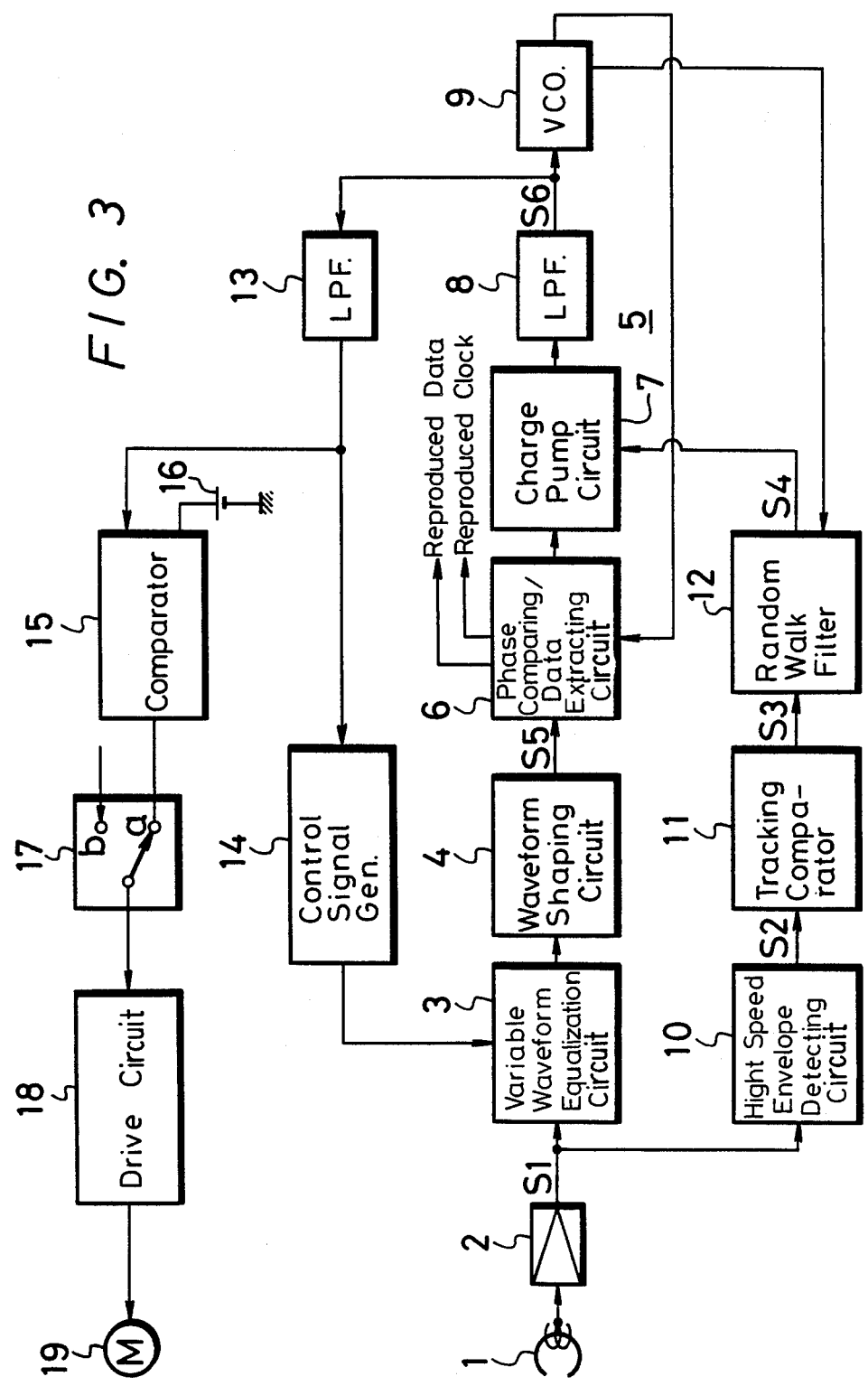
F/G. 3

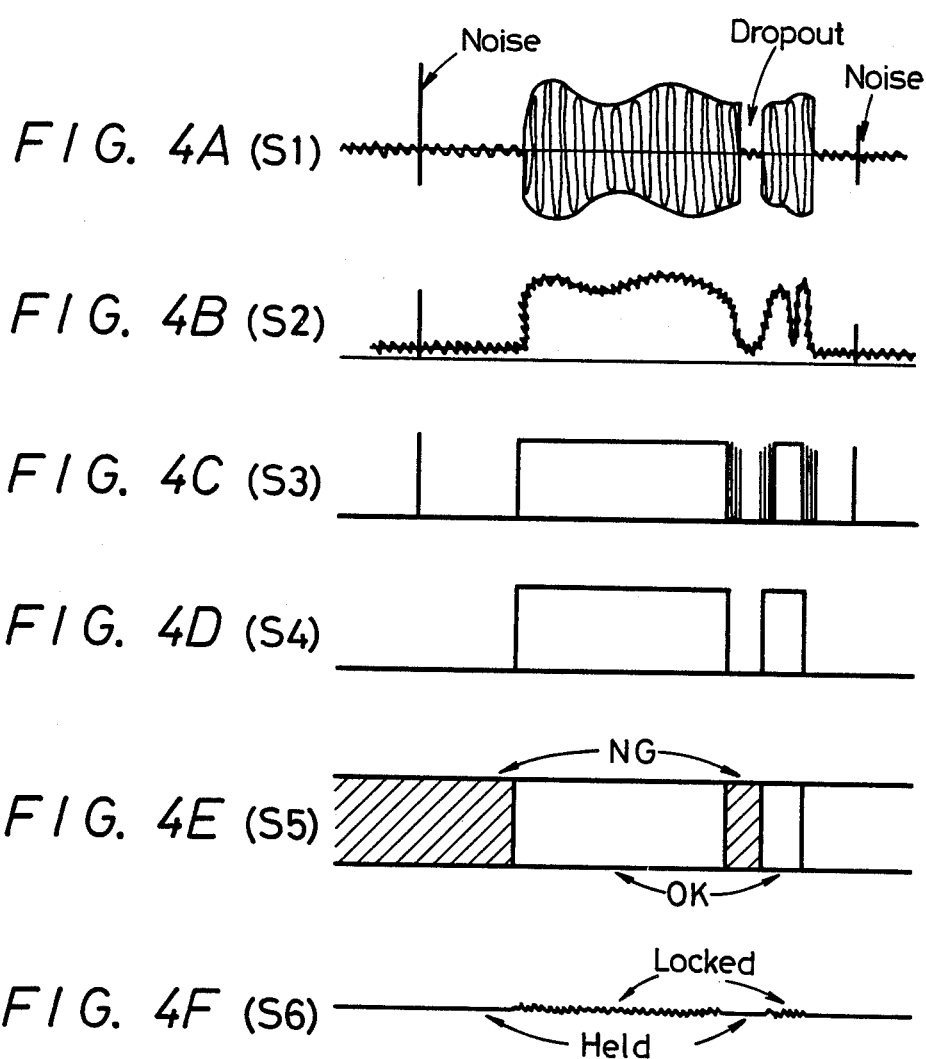

FIG. 5A (S1) 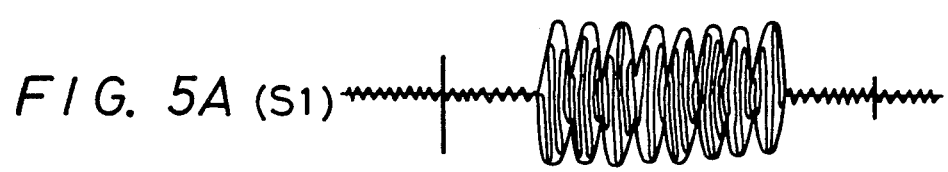
FIG. 5B (S2) 
FIG. 5C (S3) 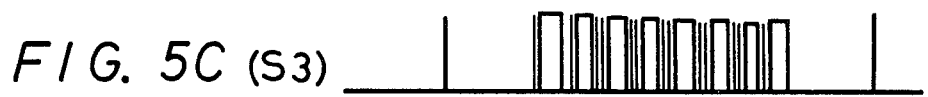
FIG. 5D (S4) 
FIG. 5E (S5) 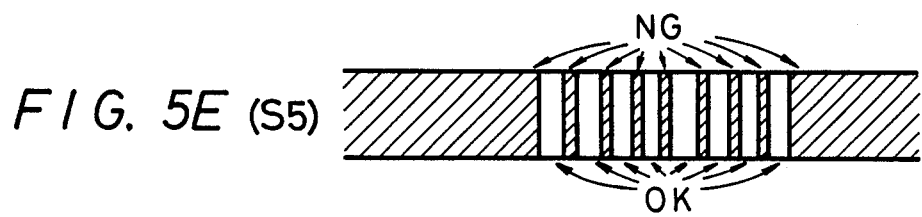
FIG. 5F (S6) 

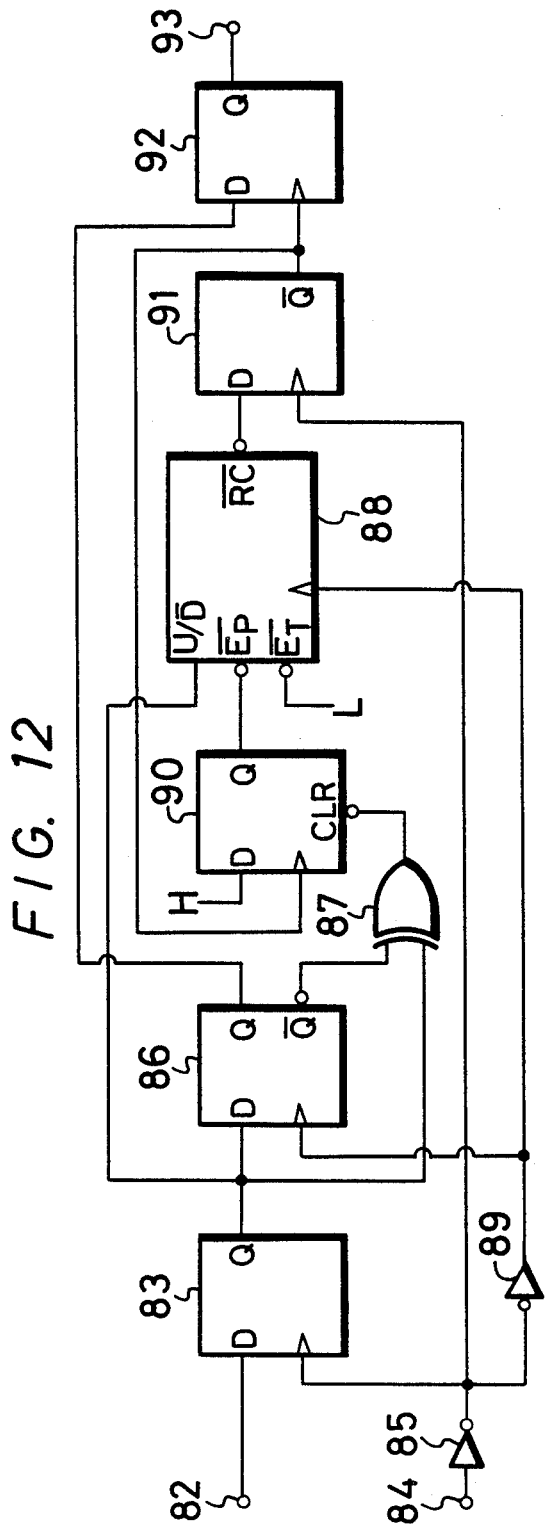
FIG. 12
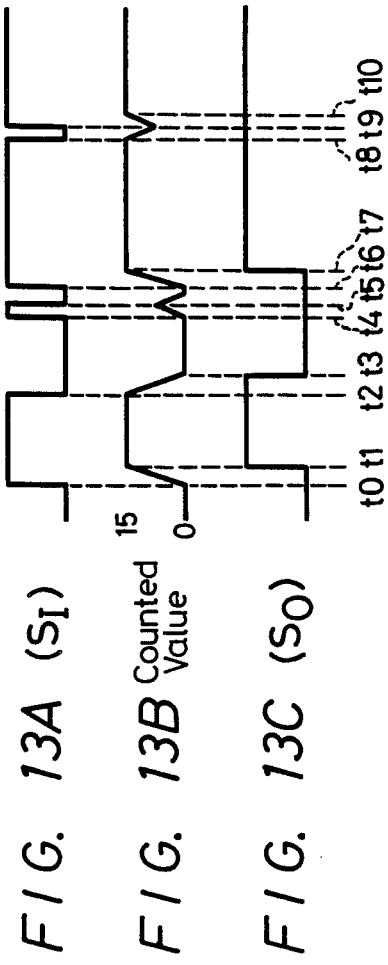
FIG. 13A ($S_I$)
FIG. 13B Counted Value
FIG. 13C ($S_O$)

APPARATUS FOR REPRODUCING A DIGITAL SIGNAL

BACKGROUND OF THE INVENTION

1. Field of the Invention

This invention relates in general to apparatus for reproducing a digital signal in which a clock signal is generated from the reproduced signal.

2. Description of the Prior Art

Transmission systems for transmitting information having burst-shape, such as recording and reproducing apparatus are known in which a plurality of rotary heads are mounted on the periphery of a tape guide drum and have, for example, equal angular spacing as, for example, an angular spacing of 180° between the heads. A magnetic tape is wrapped around the periphery of the tape guide drum at an angular spacing which is smaller than the angular range of 180° and might, for example, be in an angular range of 90°. An example of such recording and reproducing apparatus is disclosed in European patent application No. 0092403 which was filed by the assignee of the present application and published on Oct. 26, 1983.

In this prior art recording and reproducing apparatus, a radio frequency signal is reproduced by the rotary head during the normal playback mode and has a signal waveform of a burst-shape which has a high signal level as illustrated in FIG. 1A. This is because signals recorded on the tape are reproduced only when the rotary head is substantially in contact with the tape. The RF signal reproduced by the rotary head is waveform-equalized by a waveform equalization circuit and is waveform-shaped by a waveform shaping circuit and then fed to a phase locked loop circuit. The phase locked loop circuit is provided so as to generate a clock signal from the reproduced digital signal.

When the level of the RF signal is sufficiently large the voltage controlled oscillator (VCO) of the PLL circuit is locked and placed in a stable state as illustrated in FIG. 1B. When the level of the RF signal is, on the other hand, very small which means that substantially no signal exists, the VCO of the PLL circuit is not in the locked condition and is in a free running state as illustrated in FIG. 1B so that the PLL circuit runs freely which means that the VCO runs freely. Thus, the oscillation frequency of the VCO will vary near the free running frequency and the unstable state will be maintained until a regular RF signal arrives again.

This is also true for high speed playback modes such as the fast forward (FF) search mode and the rewind (REW) search mode. Thus, upon the high speed playback mode the plurality of rotary heads scan a plurality of tracks during one scanning such that at that time each head generates an output when it scans the tracks whose azimuths are coincidence with the head and each head generates no output when it scans the tracks whose azimuths are not coincident with the head so that an RF signal which has a so-called bead-shape illustrated in FIG. 2A is obtained.

Thus, the PLL circuit to which such RF signal is supplied will be locked and placed in a stable state at a location on the tape where the level of the RF signal is sufficiently large, but it will not be locked as shown in FIG. 2B and will be in a free running state and become unstable at locations on the tape where no RF signal exists or at a trough portion of the RF waveform having bead-shape.

In prior art apparatus in which the level of the RF signal becomes small, the PLL circuit is released from the locked state and the PLL circuit is put into the free running state and under these conditions there are various defects of the apparatus.

First, the capture range (oscillation frequency range of the VCO in which the PLL can be locked to the input signal which is being varied from the initial state so that the PLL is not in a locked state) cannot be widened. Even if the capture range could be widened, the pull-in time of the PLL (time necessary for locking the PLL) becomes long and the locking range of the PLL (oscillation frequency range of the VCO in which the PLL can maintain the locked state to the input signal when the input signal is being varied from the initial state such that the PLL is in the locked state) is not substantially widened. At the present time, the lock range is about ±2 to 3% under best conditions. In addition, the adjustment of the free running frequency of the oscillator is required. Furthermore, even if the recovery time of the PLL (the time period from the time when the PLL is unlocked to the time when it is locked again) from a drop out of the RF is short then the PLL will be locked for a long period of time.

Also, in the prior art waveform equalization circuit, the waveform equalization characteristic for equalizing a waveform of a signal reproduced from the tape is fixed to that which occurs in the normal playback mode. As a result in the case of for example, a high speed playback mode or a variable speed playback mode such as when the relative speed between the tape and the head becomes faster or slower than the speed in the normal playback mode, the waveform equalization characteristic which is fixed to the normal playback mode cannot properly operate with the various playback modes because the frequency of the data is shifted upwardly or downwardly in response to the relative speed. This defect causes the data error rates to be increased.

SUMMARY OF THE INVENTION

It is an object of the present invention to provide an improved apparatus for reproducing a digital signal.

Another object of the invention is to provide an apparatus for reproducing a digital signal which has a PLL circuit having an oscillator which has an oscillation condition which is stable.

According to one aspect of the present invention, there is provided apparatus for reproducing a digital signal comprising (a) a phase locked loop circuit means supplied with a reproduced signal and generating a clock signal, (b) a detecting means for detecting the level of said reproduced signal, and (c) a control means for controlling the feedback loop of said phase locked loop circuit in response to an output signal of the detecting means.

These and other objects, features and advantages of the present invention will become apparent from the following detailed description of the preferred embodiments taken in conjunction with the accompanying drawings.

BRIEF DESCRIPTION OF THE DRAWINGS

FIG. 3 is a block diagram illustrating the embodiment of the apparatus for reproducing a digital signal according to the invention;

FIGS. 4A through 4F are signal waveforms diagrams useful for explaining the operation of the apparatus shown in FIG. 3;

FIGS. 5A through 5F are signal waveform diagrams useful for explaining the operation of the apparatus shown in FIG. 3;

FIG. 12 is a block diagram illustrating one example of a practical circuit of the random walk filter illustrated in FIG. 3; and FIGS. 13A through 13C are timing waveform diagrams useful for explaining the operation of the filter illustrated in FIG. 12.

DESCRIPTION OF THE PREFERRED EMBODIMENTS

Figure 1A:
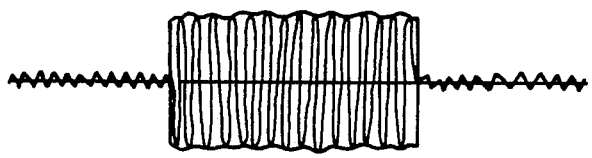
FIGS. 1A and 1B are signal waveform diagrams useful for explaining a prior art example.
Figure 1B:
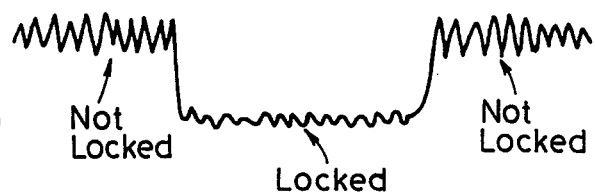
Figure 2A:
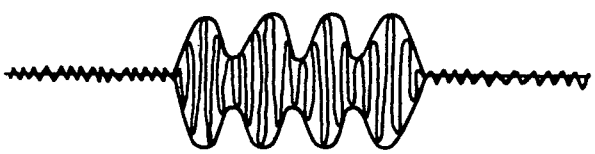
FIGS. 2A and 2B are signal waveform diagrams useful for explaining a prior art example.
Figure 2B:
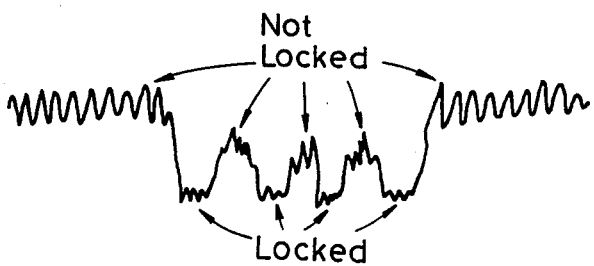

The present invention is illustrated in and will be described with reference to FIGS. 3 through 13.

FIG. 3 is a block diagram illustrating an overall circuit arrangement of an embodiment of the present invention. A rotary head 1 which typifies a plurality of rotary heads are mounted on the periphery of a tape guide drum at an angular spacing of 180°. The tape guide drum is not shown. These rotary heads are alternately switched by a switching pulse and the outputs from the heads are removed. Though not shown, an magnetic tape, is wrapped around the periphery of the tape guide drum over an angular spacing of, for example 90°.

As shown in FIG. 3, the reproduced signal (RF signal) which is read out from the recording medium as, for example, a magnetic tape by the rotary head 1 is amplified by an amplifier 2 and supplied to a variable waveform equalization circuit 3 in which it is waveform equalized. The output from the variable waveform equalization circuit is supplied to waveform shaping circuit 4 in which it is waveform-shaped and then fed to a PLL (phase locked loop) circuit 5. The PLL circuit 5 comprises a phase comparing/data extracting circuit 6 which receives the output of the waveform shaping circuit 4. A charge pump circuit 7 receives the output of the phase comparing data extracting circuit 6 and supplies an output to the low pass filter 8 of a complete integration type. A voltage controlled oscillator VCO 9 receives an output of the low pass filter 8 and supplies an input to the phase comparing data extracting circuit 6.

The output of the amplifier 2 is also supplied to a high speed envelope detecting circuit 10 in which the envelope of the reproduced signal (RF signal) is full wave rectified at high speed and converted to an envelope waveform. The detected output from the envelope detecting circuit 10 is supplied to a tracking comparator 11 in which it is compared with a threshold level that can be automatically varied in response to the envelope waveform so as to substantially detect a point where the RF signal drops out. The output from the tracking comparator 11 is supplied to a random walk filter 12 in which the unstable portion (flapping portion) which exists at the side edges of the output waveform of the tracking comparator 11 is removed. In other words, the tracking comparator 11 and the random walk filter 12 serve as a form of wave-shaping means for wave-shaping the envelope output. The random walk filter 12 is supplied with a clock signal which has a frequency which results from dividing the oscillator frequency of the VCO 9 by a predetermined factor. Thus, in the random walk filter 12, the state transition speed is changed by the phase-compared frequency so that the occurrence of useless time can be reduced as compared with a filter using a normal fixed clock signal.

The output from the random walk filter 12 is supplied to the charge pump circuit 7 as a control signal which controls the charge pump operation. Specifically, when the control signal is, for example, at a high level, the charge pump operation will be carried out or the feedback loop will be closed and the PLL circuit will be locked. On the other hand, when the control signal is at a low level, the charge pump operation is stopped and the feedback loop is opened and the PLL circuit is placed in the holding state. In this case, the envelope detecting circuit 10, the tracking comparator 11 and the random walk filter 12 constitute a feedforward system.

Also, at the output side of the low pass filter 8, another low pass filter 13 is connected. This low pass filter 13 may comprise a low pass filter having a relatively large time constant such that noise contained in the output from the low pass filter 8 will be removed. The output from the low pass filter 13 is supplied to a control signal generating circuit 14 and the control signal generating circuit generates in response to the output of the low pass filter 13 corresponding to the relative speed between the tape and the head or in other words in response to the control voltage of the VCO 9 a control signal which is supplied to the variable waveform equalization circuit 3 in modes other than the recording mode and the normal playback mode as, for example, the high speed playback mode and the variable speed playback mode. The variable waveform equalization circuit 3 is constructed so it can change its waveform equalization characteristic in response to the relative speeds in a manner such that, for example, when the relative speed is higher than that of the normal playback, the waveform equalization characteristic is shifted to the upper side in frequency by a predetermined amount as compared to that in the normal playback mode and when the relative speed is lower than that of the normal playback mode, the waveform equalization characteristic is shifted to the lower side in frequency by a predetermined amount as compared to the normal playback mode. Thus, the waveform equalization characteristic of the variable waveform equalization circuit is always set at the best data error rate. The output from the low pass filter 13 is supplied to one input terminal of a comparing circuit 15. Another input terminal of the comparing circuit 15 receives a reference voltage from a reference voltage source 16. The reference voltage is set at a value equal to the control voltage for the VCO 9 which is generated at the output side of the low pass filter 8 during the normal playback mode.

The output from the comparing circuit 10 is supplied to a contact a of a switching circuit 17 and the switching circuit 17 is supplied at its other contact b with a control voltage generated in the normal playback mode. The switching circuit 17 is connected by its contact a by a mode switching signal from a microcomputer which is not shown during high speed playback mode and it is switched to the contact b during normal playback mode.

The output from the switching circuit 17 is supplied through a drive circuit 18 to a drum motor 19 which drives a drum on which the rotary head is mounted. The drum motor 19 is controlled such that during high speed playback mode, the compared error signal from the comparing circuit 15 will become zero or the control voltage for the VCO 9 during high speed playback mode will become equal to the control voltage for the VCO during the normal playback mode. In other words, the relative speed between the tape and the head during high speed playback mode will become equal to the relative speed between the tape and the head during normal playback mode.

FIGS. 4A through 4F are signal waveform diagrams which are useful for explaining the operation of the circuit shown in FIG. 3 during the normal playback mode. When an RF signal S1 illustrated in FIG. 4A which contains noise and a dropout is supplied to the envelope detecting circuit 10, it is full wave rectified by the envelope detecting circuit 10 and then the envelope waveform signal S2 illustrated in FIG. 4B is produced at the output of the envelope detecting circuit 10. The envelope waveform signal S2 is supplied to the tracking comparator 11 where it is compared with the threshold level which can automatically be varied in response to the level of the envelope waveform signal S2. The result is that the tracking comparator 11 generates at its output an output signal S3 which is illustrated in FIG. 4C. As can be seen in FIG. 4C, during a period in which the signal S3 has a low level, the envelope waveform signal S2 corresponding to the RF signal S1 does not reach the threshold level and the RF signal S1 has a bad state. On the other hand, during the period in which the signal S3 has a high level, the envelope waveform S2 corresponding to the RF signal S1 reaches the threshold level and thus the RF signal S1 will be in a good state. For this condition, since the noise of the envelope waveform as well as the noise of the system are superimposed upon the waveform of the output signal S3 from the tracking comparator 11 a signal having a beard-shape occurs near the side edge of the signal. Thus, the waveform of the output signal does not have a desirable form.

Therefore, the output signal S3 of the tracking comparator is supplied to the random walk filter 12 to remove the flapping portion. As a result, the random walk filter 12 generates at its output an output signal S4 which has a satisfactory waveform as illustrated in FIG. 4D.

At the output side of the waveform shaping circuit 4, an output signal S5 is obtained which is shown in FIG. 4E which results from the waveform equalizing of the RF signal S1 shown in FIG. 4A and the waveform shaping of the signal. When the output signal S5 is compared with the output signal S4 illustrated in FIG. 4D and which occurs at the output of the random walk filter 12, it is seen that when the output signal S4 from the random walk filter 12 has a high level, good data (OK) are found in the output signal S5 which is generated by the waveform shaping circuit 4 while when the output signal S4 has a low level, bad data (NG) occur in the output signal S5. In other words, when the output signal S4 from the random walk filter 12 has a high level, the output signal S5 from the waveform shaping circuit 4 is a good signal and is a signal suitable to be supplied to the PLL 5. On the other hand, when the output signal S4 from the random walk filter 12 has a low level, the output signal S5 from the waveform shaping circuit 4 is not satisfactory and this signal is unsuitable to be supplied to the PLL 5.

Thus, the output signal S4 from the random walk filter 12 is supplied to the charge pump circuit 7 as the control signal for such circuit so as to control the operation. The output signal S5 from the waveform shaping circuit 4 is supplied to the phase comparing/data circuit 6 where it is phase compared with the signal from the VCO 9. The phase compared error signal from circuit 6 is supplied to the charge pump circuit 7. During this time, when the output signal S4 from the random walk filter 12 has a high level, the charge pump circuit will be placed in an operable state so as to allow charging current to flow to the low pass filter 8 so that the feedback loop of the PLL circuit 5 will be substantially closed and the PLL circuit will be put into a locked state. When the output signal S4 is on the other hand, at a low level, the charge pump circuit will be placed into an inactive state which inhibits the flow of charging current into the low pass filter 8 so that the feedback loop of the PLL circuit is substantially opened so as to place the PLL circuit in a holding state and, thus, the VCO will oscillate in the locked condition.

At that time, the VCO 9 will be supplied with an output signal S6 which is shown in FIG. 4F from the low pass filter 8. As a result, the oscillating frequency of the VCO 9 will be stabilized at a substantially constant oscillating frequency and will not return to a predetermined free running frequency.

FIGS. 5A through 5F are signal waveform diagrams showing signal waveforms of respective sections in the high speed playback mode. Since the operation of the respective circuits are similar to those in the playback mode, the signal waveforms corresponding to those illustrated in FIGS. 4A through 4F are marked with the same reference numerals S1 through S6.

Since in the prior art, the unlocking of the PLL by an external disturbance or the like, only depends on the feedback system of the PLL itself, the capture range cannot be widened and the pulling time cannot be reduced. According to the embodiment of the invention as described above, since the state of the RF signal is detected by other circuits such as a feed forward system circuit so as to control the feedback system circuit, it is possible to have a clock extracting circuit which includes the PLL circuit which resists strongly external disturbances and which the capture range and the locking range are wide and the pulling time is short and where substantially no adjustments are required.

In operation, the variable waveform equalization circuit 3 will be described with reference to FIGS. 6 and 7.

Figure 6:
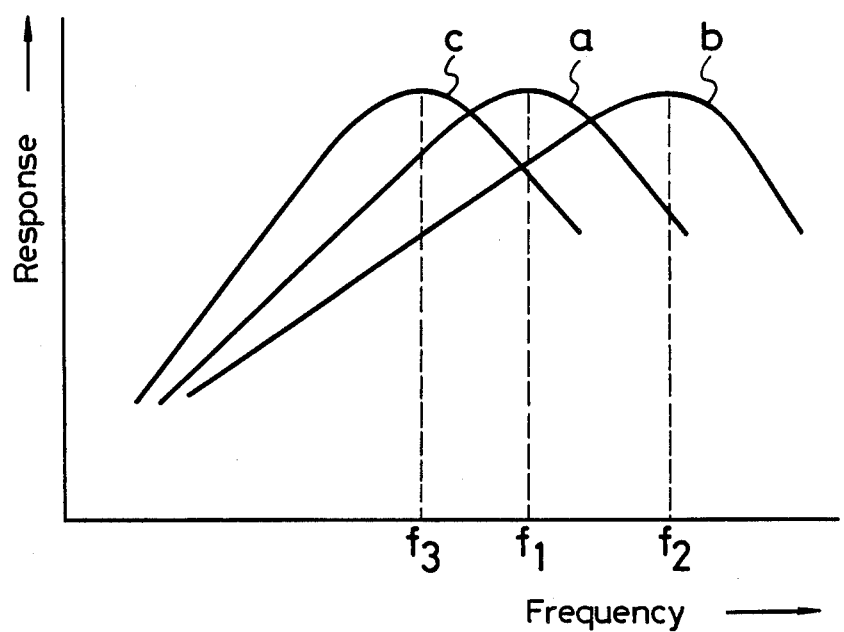
FIG. 6 is a waveform equalization characteristic graph useful for explaining the operation of the variable waveform equalization circuit shown in FIG. 3.
Figure 7:
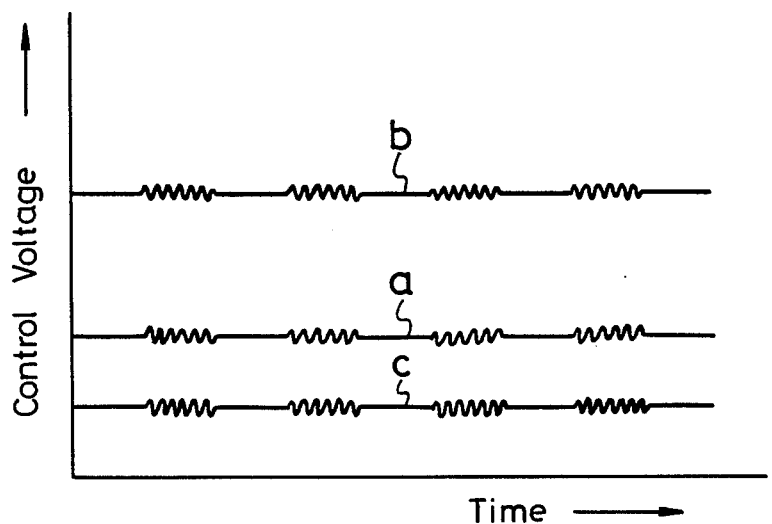
FIG. 7 is a graph of a VCO control voltage useful for explaining the VCO.

When the waveform equalization characteristic of the variable waveform equalization circuit is examined, the waveform equalization characteristic during the normal playback mode is represented by, for example, a curve a illustrated in FIG. 6 and in the control voltage S6 relative to the VCO 9 at that time is placed at a position or level shown by reference a in FIG. 7.

When the reproducing apparatus is placed, for example, in the high speed playback mode and the relative speed between the tape and the head become faster than in the normal playback mode, the control voltage S6 to the VCO 9 will be raised up to the position or level illustrated by b in FIG. 7. Accordingly, the constant of the variable form equalization circuit is varied by the control signal from the control signal generating circuit 14 so that the waveform equalization characteristic of the circuit 3 is shifted upwardly in frequency by a predetermined as shown by curve b in FIG. 6. When the relative speed becomes on the other hand, lower than that in the normal playback mode, the control voltage to the VCO 9 will be lowered to the position or level shown by reference c in FIG. 7. Consequently, the constant of the variable waveform equalization circuit 3 is varied by the control signal from the control signal generating circuit 14 so that the waveform equalization characteristic of the circuit 3 is shifted downwardly in frequency by a predetermined amount as illustrated by the curve c in FIG. 6.

By way of example, consider a data of a continuous pattern of a minimum transition interval (Tmin=1T) of a signal that is digitally recorded. Although during normal playback mode, the frequency is placed at a position $F_1$ on the frequency axis of FIG. 6, if the relative speed increases, the frequency is shifted upwardly to a position $f_2$. Thus, if the waveform equalization characteristic is fixed to the characteristic shown by the curves a in FIG. 6, the data cannot be covered by the waveform equalization characteristic shown by the curve a in a substantial manner so that the error rate in the data becomes higher. Therefore, when the relative speed becomes higher, the waveform equalization characteristic of the variable waveform equalization circuit 3 is shifted so that it becomes the characteristic shown by curve b such that the frequency of the data of the 1T pattern is substantially placed at the position of the peak portion of the waveform equalization curve b so that a so-called eye pattern for the 1T pattern data will be opened. Thus, the data can be extracted precisely and the error rate of the data can be improved.

Conversely, when the relative speed becomes slower, the frequency of the 1T pattern data will be lowered to a position $f_3$. Then if the waveform equalization characteristic is fixed to the curve a, the error rate of the data will increase. Therefore, when the relative speed becomes slower, the waveform equalization characteristic of the variable waveform equalization circuit 3 is shifted so as to take the characteristic shown by the curve c as described above. Consequently, the frequency of the 1T pattern data is substantially placed at the position of the peak portion of the waveform equalization curve c so that the eye pattern for 1T pattern data is opened. Thus, the data can be extracted in a precise manner and the error rate of the data will be decreased. This is also true for 2T through 4T patterns as well.

Referring again to FIG. 3, when the PLL circuit 5 is in the locked state, the control voltage to the VCO 9 substantially indicates the relative speed between the tape and the head. Thus, in the high speed playback mode where the swithing circuit 17 is connected to contact a, the control voltage to the VCO will be supplied through the low pass filter 13 to the comparing circuit 15 where it is compared with the reference value from the reference voltage source 16. Then the compared error signal from the comparing circuit 15 is supplied through contact a of the switching circuit 17 to the drive circuit 18 and to the drum motor 19.

In this manner, by closing the loop during high speed playback mode, the error voltage of the PLL circuit 5 or the control voltage to the VCO 9 can be approximated to that utilized during normal playback mode. In other words, this operation is the same as the operation for making the relative speed between the tape and the head constant so that the relative speed between the tape and the head in the high speed playback mode becomes equal to the relative speed during the normal playback mode.

Figure 8:
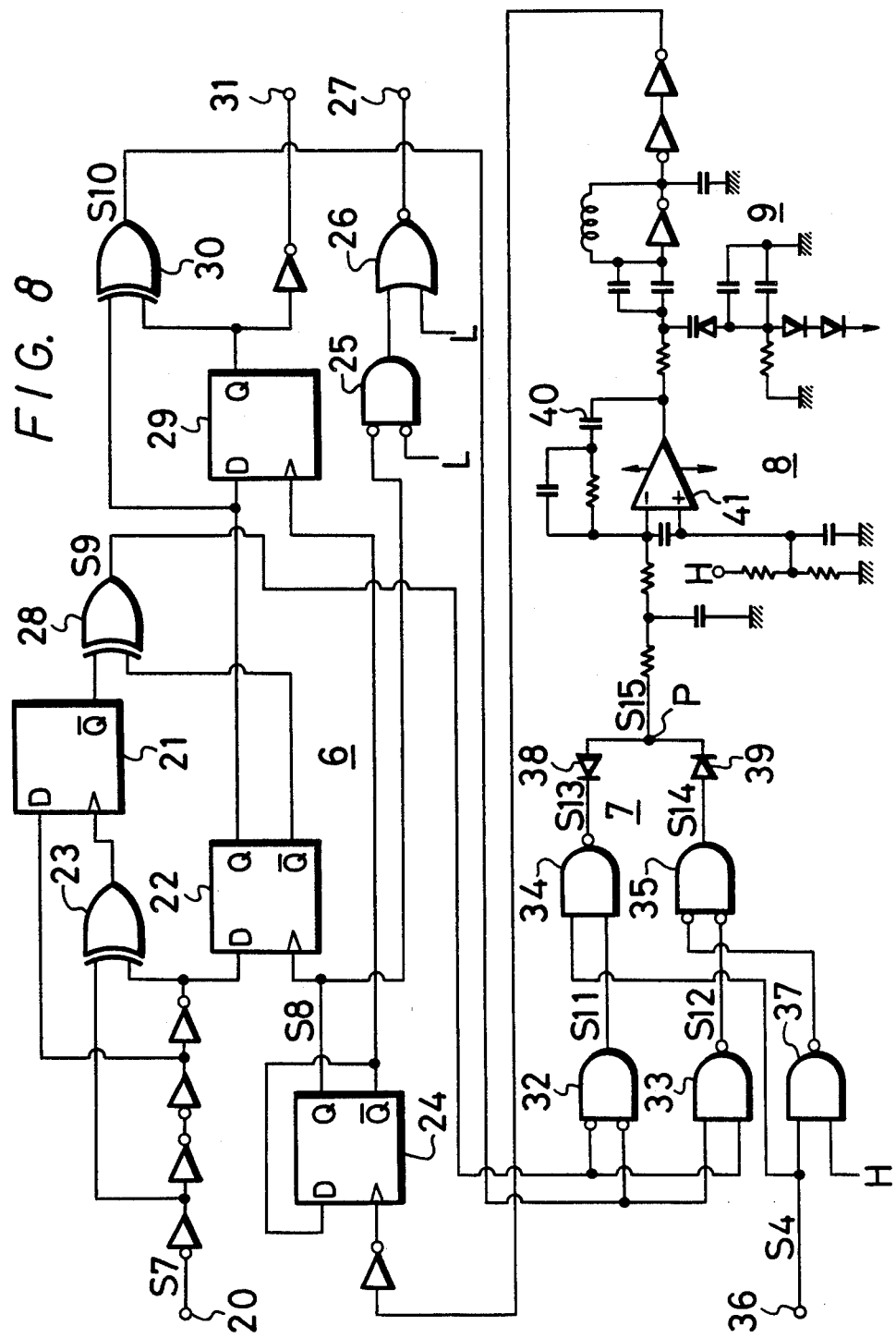
FIG. 8 is a circuit diagram showing one example of a practical circuit arrangement of the PLL circuit illustrated in FIG. 3.
Figure 9:
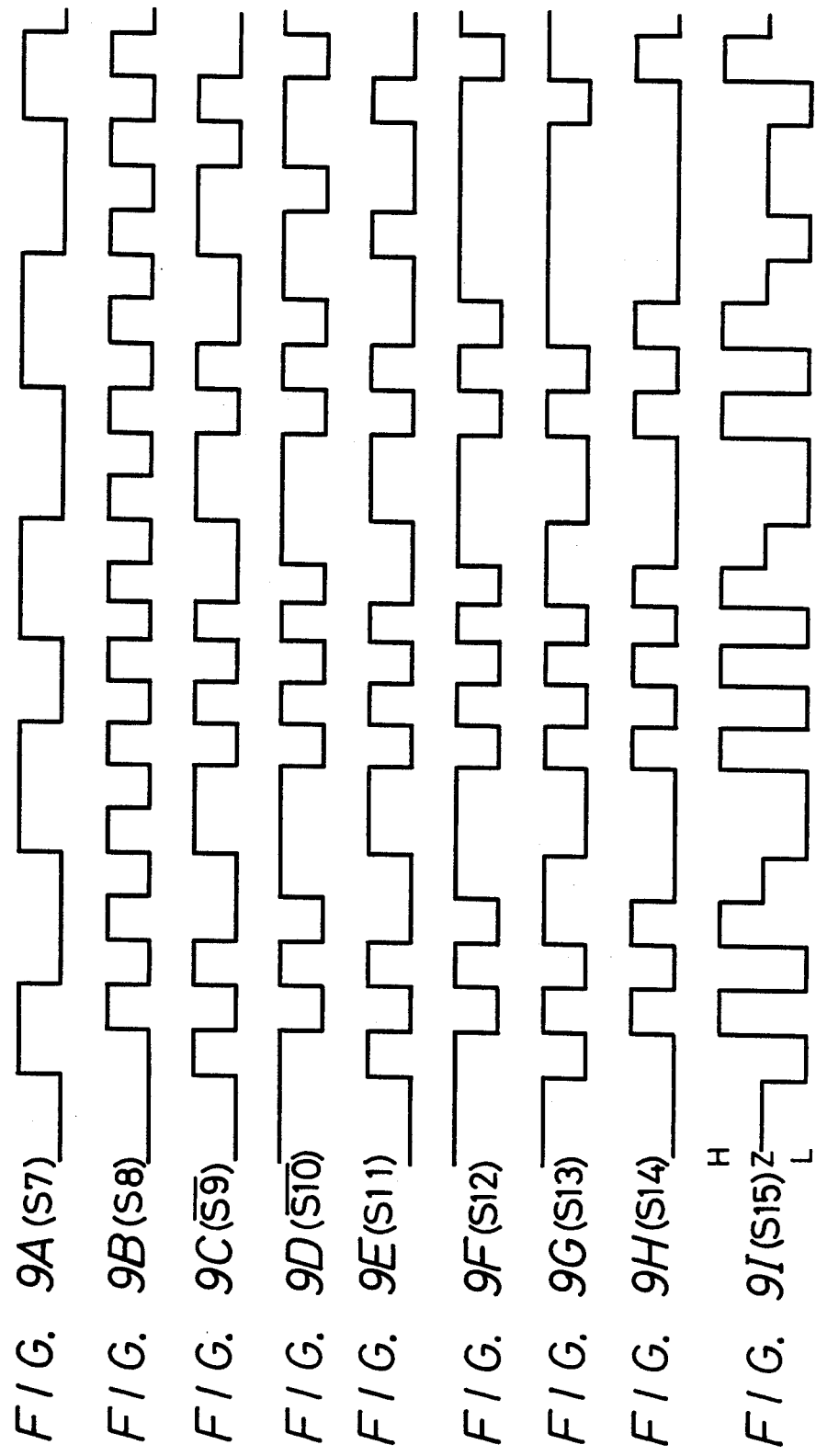
FIGS. 9A through 9I are timing waveform diagrams useful for explaining the operation of the circuit shown in FIG. 8.

FIG. 8 is a circuit diagram illustrating one example of a practical circuit arrangement of the PLL circuit 5. As shown in FIG. 8 an input terminal 20 is connected to the output of the waveform shaping circuit 4 illustrated in FIG. 3 and a signal S7 which corresponds to the signal S5 shown in FIGS. 4E and 5E and is also shown in FIG. 9A is supplied to the D input terminals of a D type flipflop circuits 21 and 22 and is also supplied through an exclusive-OR (hereinafter referred to as EOR) circuit 23 to the clock input terminal of the flipflop circuit 21. The output signal from the VCO 9 is supplied to a D type flipflop circuit 24 which generates at its outputs a signal S8 illustrated in FIG. 9B. The signal S8 is delivered through NOR circuits 25 and 26 to a clock output terminal 27 and forms a reproduced clock signal.

The signal S8 from the flipflop circuit 24 is supplied to the clock terminal of the flipflop circuit 22 and the inverted outputs from the flipflop circuits 21 and 22 are supplied to an EOR circuit 28 and the EOR circuit 28 generates at its output a signal S9 which is the feedback signal. FIG. 9C illustrates a signal $\overline{S9}$ which comprises the inverted signal S9. The output from the flipflop circuit 22 is supplied to a D input terminal of a flipflop circuit 29 and to an EOR circuit 30. Then an inverted output from the flipflop circuit 24 is supplied to the clock terminal flipflop circuit 29 and the output of the flipflop circuit 29 is supplied to a data output terminal 31 and comprises the reproduced data.

The output from the flipflop circuit 29 is supplied to the EOR circuit 30 so that the EOR circuit 30 will generate at its output a signal S10 which is a reference signal. FIG. 9D shows a signal $\overline{S10}$ which results from inverting the signal S10. The PLL circuit is operated such that the time widths are durations of the signal S10 and S9 are equal to each other.

The signals S9 and S10 are supplied to a NOR circuit 32 and to a NAND circuit 33 which are included in the phase comparing/data extracting circuit 6. The NOR circuit 32 generates and produces at its output a signal S11 which is illustrated in FIG. 9E and the NAND circuit 33 generates and supplies to its output a signal S12 illustrated in FIG. 9F. The signals S11 and S12 are respectively supplied to a NAND circuit 34 and to a NOR circuit 35 of the charge pump circuit 7. At an input terminal 36 which is connected to the output of the random walk filter 12 illustrated in FIG. 3, the signal S4 illustrated in FIGS. 4D and 5D is supplied to the NAND circuit 34 and is supplied through a NAND circuit 37 to the NOR circuit 35. The result is that the NAND circuit 34 generates at its output a signal S13 illustrated in FIG. 9G and the NOR circuit 35 generates at its output a signal S14 illustrated in FIG. 9H.

The charge pump circuit 7 includes diodes 38 and 39 connected in opposite polarity to each other. The cathode of the diode 38 is connected to the output of the NAND circuit 34 and the anode is connected to connection point P between the diodes 38 and 39. The anode of the diode 39 is connected to the output of the NOR circuit 35 and the cathode is connected to the connection point P. The signal S13 is supplied to the diode 38 and the signal S14 is supplied to the diode 39 with the result that a signal S15 illustrated in FIG. 9I occurs at connection point P and comprises the phase-compared error signal.

If there are many time periods in which the signal S15 is at a low level (L), the oscillating frequency of VCO 9 will be increased and when there are many time periods in which the signal S15 is at high level (H) the oscillating frequency of the VCO will be decreased. In other words, when the time periods in which the signal S15 is at a low level increases, the charges accumulated in an integration capacitor 40 of the low pass filter 18 are discharged so that the output (VCO control voltage) of the integrating type amplifier 41 is increased so as to increase the oscillating frequency VCO 9. On the other hand, when the time periods during which the signal S15 is at a high level increases, then a current flows into the integration capacitor which accumulates the charges so that the output (VCO control voltage) of the integrating type amplifier decreases and the oscillation frequency of the VCO 9 decreases. Also, when the signal S15 is in a high impedance state (Z), the feedback loop is opened to place the PLL circuit in the holding state and the VCO control voltage will be held in the holding state so that the VCO 9 oscillates at a frequency when the PLL 5 is locked.

The above described operation explains the normal operation accomplished with the feedback system of the PLL circuit 5. In the present invention, the feedback system is controlled by the feedforward system. Specifically, when the output signal S4 supplied to the input terminal 36 from the random walk filter 12 has a high level the operation of the charge pump circuit 7 depends on the signals S11 and S12. When the output signal S4 is alternatively at a low level, then regardless of the levels of the signals S11 and S12, the signal S13 becomes high level and the signal S14 becomes low level so that the diodes 38 and 39 are both reversed biased. In consequence, the feedback loop is opened and the PLL 5 is unlocked and then placed in a holding state. Then the VCO voltage is held at the same voltage and the VCO 9 oscillates at the frequency determined by such voltage when the PLL 5 is locked. In other words, when the output signal S4 becomes low in response to a portion of unsatisfactory data of the signal S7, the PLL circuit is placed in a holding state so that even if the PLL circuit 5 is released from being locked, the oscillating frequency of the VCO 9 will not be returned to the predetermined free running frequency, but the VCO will oscillate at the oscillating frequency which existed when the PLL 5 was locked and the oscillating operation of the VCO will be stable.

Figure 10:
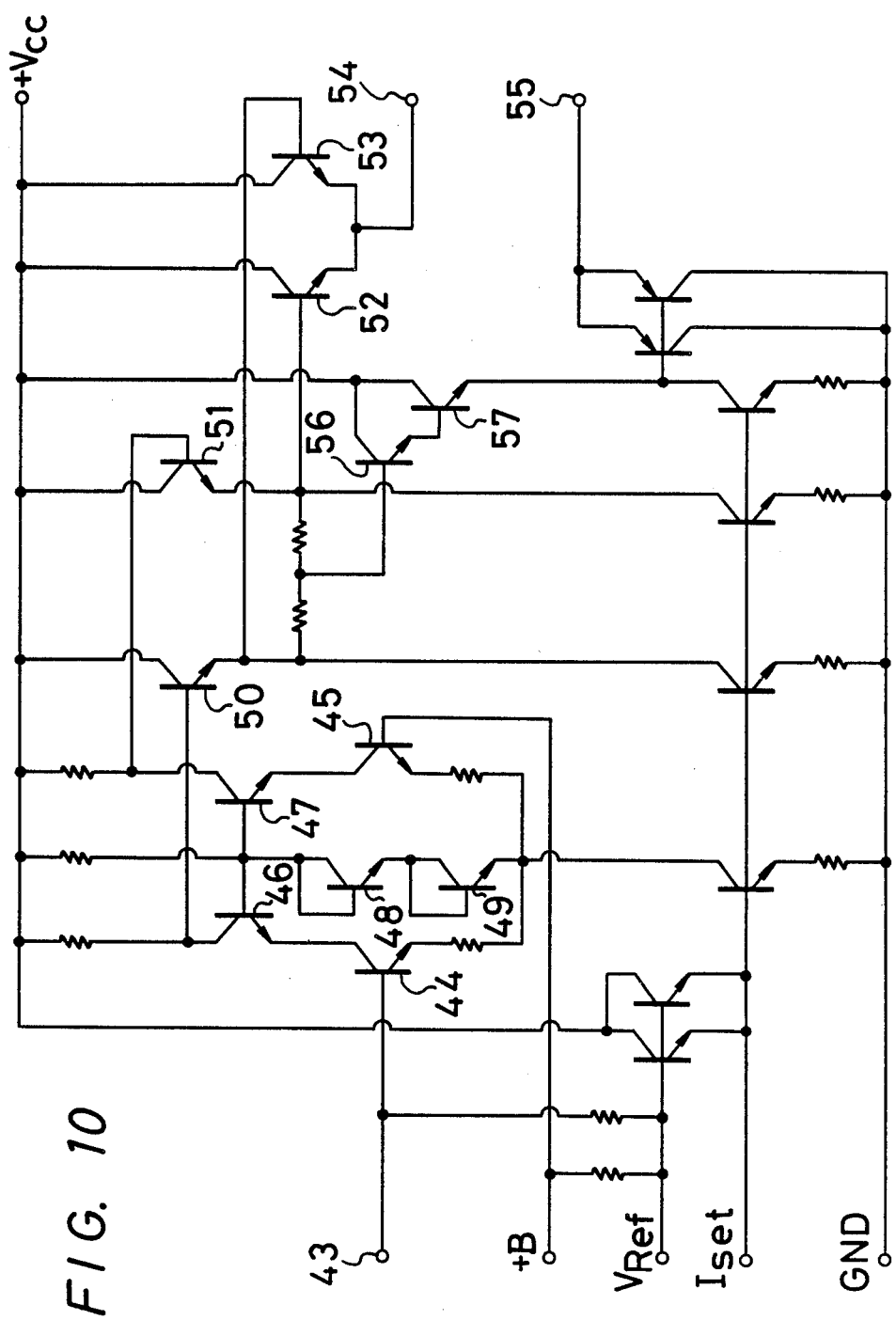
FIG. 10 is a connection diagram showing one example of a practical circuit of the high speed envelope detecting circuit illustrated in FIG. 3.

FIG. 10 illustrates an example of a practical circuit of the high speed envelope detecting circuit 10. A signal is supplied at an input terminal 43 which is connected to the output side of the amplifier 2 illustrated in FIG. 3 and is converted from an unbalanced signal to a balanced signal by a cascade amplifier which comprises the transistors 44, 45, 46, 47, 48 and 49. The balanced signal is then converted in impedance by a differential amplifier formed by the transistors 50 and 51 and is then detected by a detector comprising the transistors 52 and 53. The result is that there is obtained an output signal whose envelopes have been detected. The output terminals 54 and 55 are connected to the input side of the tracking comparator 11 illustrated in FIG. 3. Since the output from the detector are emitter-follower outputs, the high speed envelope detection is possible. Transistors 56 and 57 are connected in a Darlington connection and are used for impedance conversion.

Figure 11:
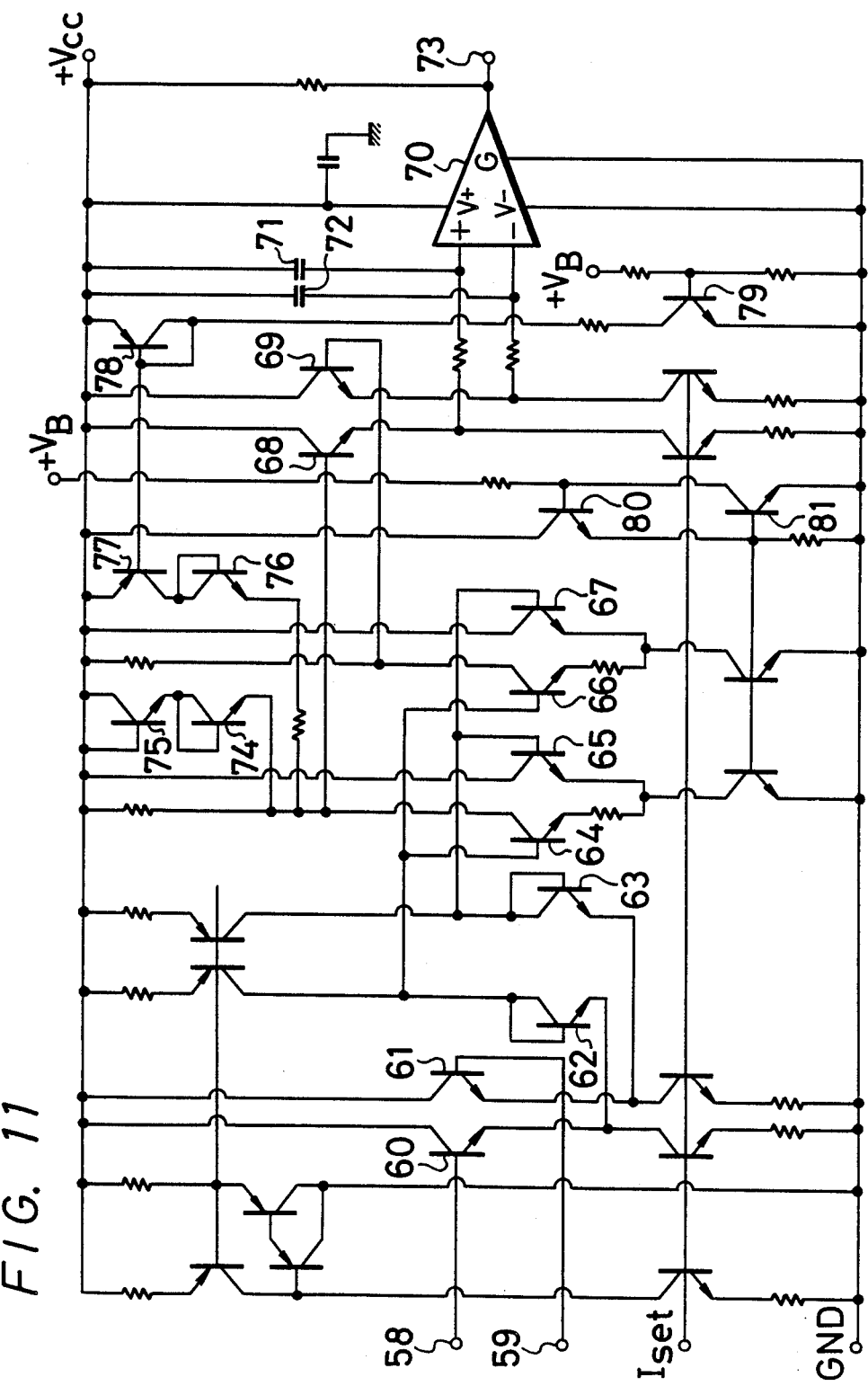
FIG. 11 is a connection diagram showing an example of a practical circuit arrangement of the tracking comparator circuit illustrated in FIG. 3.

FIG. 11 illustrates an example of a practical circuit of the tracking comparator 11. Input terminals 58 and 59 are connected to the output terminals 54 and 55 illustrated in FIG. 10 of the envelope detecting circuit. The input terminal 58 comprises the signal input and the input terminal 59 comprises the reference signal input. The input signals applied to the input terminals 58 and 59 are supplied to a differential amplifier formed of transistors 60 and 61 which converts the impedance. Then they are supplied to transistors 62 and 63 where potentials of the signals are increased and delivered to a differential amplifier comprising the transistors 64 and 65 and to a differential amplifier comprising the transistors 66 and 67 where they are amplified.

The signals amplified by the transistors 64, 65, 66 and 67 are converted in impedance by a differential amplifier comprising the transistors 68 and 69 and are then fed to a comparator 70. The comparator 70 compares the signal supplied to its non-inverting input terminal with the reference level (threshold level) supplied to its inverting input terminal. This reference level can automatically be varied in response to the level of the envelope waveform. For this purpose, the input terminals of the comparator 70 are connected to integrating capacitors 71 and 72, respectively. An output terminal 73 is connected to the output of the comparator 70.

Since the reference level can automatically be varied in response to the level of the envelope waveform, it is possible to automatically match the reference level with the level of the RF signal and also it is possible to detect when the head crosses the track accurately during high speed playback mode.

The transistors 74 and 75 are limiters and the transistors 77, 78 and 79 are used to lower the reference level during normal playback mode. Transistors 80 and 81 are used to set bias voltage.

FIG. 12 is an example of a practical circuit of the random walk filter 12. An input terminal 82 is connected to the output terminal 73 illustrated in FIG. 11 of the tracking comparator 11. The input terminal 82 is connected to the D input of a D-type flipflop circuit 83. The flipflop circuit 83 is supplied at its clock terminal with a clock signal supplied at a clock terminal 84 which is connected to the output side of the VCO 9 illustrated in FIG. 3 through an inverter 85. The output from flipflop circuit 83 is supplied to a D input terminal of a D flipflop circuit 86 as well as to an EOR circuit 87 and to an up/down (U/$\overline{\text{D}}$) terminal of an up/down counter 88. The up/down counter 88 is placed in the count up operation when the signal supplied to its up-down terminal (U/$\overline{\text{D}}$) has a high level and it is put into a countdown operation when the signal has a low level.

The clock signal applied to the clock input terminal 84 is supplied through inverters 85 and 89 to the clock terminals of the flipflop circuit 86 and the up/down counter 88. The inverted output from the flipflop circuit 86 is supplied to the EOR circuit 87 and the output of the EOR circuit 87 is supplied to a clear terminal CLR of a D-type flipflop circuit 90 and serves as the reset signal. The D-input terminal of the flipflop circuit 90 goes to a high level and the flipflop circuit 90 is supplied at its clock terminal with an inverter output of a D-type flipflop circuit 91 provided at the output of the up-down counter 88. The output from the flipflop circuit 90 is supplied to an enable terminal $\overline{Ep}$ of the up-down counter 88 so that when the signals supplied to the enable terminal $\overline{Ep}$ has a low level, the up-down counter 88 is placed in the counting state and when the signal is supplied to the enable terminal Ep when it is at high level, the up-down counter 88 is placed into the counting stop state.

A signal from a ripple carry terminal RC of the up-down counter 88 is supplied to the D-input terminal of the flip-flop circuit 91 and the clock signal which has been inverted by the inverter 85 is supplied to the clock terminal of the flipflop circuit 91. The inverted output from the flipflop circuit 91 is supplied to the clock terminal of a D-type flipflop circuit 92 and the output from the flipflop circuit 86 is supplied to the D input terminal of the flipflop circuit 92. The output from the flipflop circuit 92 is delivered to an output terminal 93 and this output is supplied to the charge pump circuit 7 illustrated in FIG. 3 as the control signal.

The up-down counter 88 assumes 16 stages from for example 0 to 15 during operation. When the up-down counter 88 is supplied with a signal S1 shown in FIG. 13A at the input terminal 82, the up-down counter starts the count-up operation at a time of $t_0$ illustrated in FIG. 13B. When the counted value of the up-down counter 88 reaches 15 (maximum value) at a time $t_1$, an output signal $S_0$ which appears at the output terminal 93 and is illustrated in FIG. 13C goes to a high level. When this input signal S1 has a low level at a time $t_2$, the up-down counter 88 starts countdown operation. When the counted value of the up-down counter 88 reaches zero (minimum value) at a time $t_3$, the output signal $S_0$ goes to low level. When the input signal S1 goes to a high level again at a time $t_4$, the up-down counter 88 starts countup operation. However, when the input signal S1 becomes low level at a time $t_5$ starting at time $t_5$, the up-down counter carries out countdown operations. In other words, between the times $t_4$ and $t_5$, before the counted value of the up-down counter 88 reaches the maximum value of 15, the up-down counter 88 enters the countdown operation. Accordingly, since the counted value of the up-down counter 88 does not reach the maximum, the output signal $S_0$ maintains the low level during this period. Thereafter, since the counted value of the up-down counter 88 reaches the minimum value, the output signal $S_0$ maintains the low level and holds such level.

When at a time $t_6$, the input signal $S_I$ goes to a high level, again the up-down counter starts to count up. When the counted value of the up-down counter 88 becomes 15 (maximum value) at a time $t_7$, the output signal $S_0$ goes high level. When the input signal $S_I$ goes to a low level at a time $t_8$, the up-down counter 88 starts countdown operation. However, when at a time $t_9$, the input signal $S_I$ goes high, at this time the up-down counter 88 enters the count-up operation from time $t_9$. In other words, between the times $t_8$ and $t_9$ before the counted value of the up-down counter 88 reaches the minimum value which is zero, the up-down counter 88 starts the count-up operation. Thus, since the counted value of the up-down counter 88 does not reach the minimum value of zero, the output signal $S_0$ maintains a high level during such time period. Then since the counted value of the up-down counter 88 reaches the maximum value at a time $t_{10}$, the output signal $S_0$ maintains a high level.

As above described, by passing the output of the tracking comparator 11 through the random walk filter 12, unstable factors such as flapping portions which are produced near the side edges of the pulse of the input signal $S_I$ are removed so that the signal is shaped in waveform and a satisfactory signal is generated.

According to the present invention, since the state of the RF signal (reproduced data) is detected by the circuit in the feed forward system and the feedback system of the PLL circuit is controlled by the detected output, the PLL circuit used in the operation of the invention resists external disturbances and the capture range in lock range of the PLL circuit can be extended to be more than ±20% and the pull-in time of the PLL circuit will be about 20 microseconds in the normal playback mode and 5 microseconds if the RF signal is in good condition and, thus, the pull-in operation can be carried out at substantially high speeds. Since also the free running frequency does not occur, a frequency adjustment is unncessary and the recovery from dropout can be quickly accomplished. Also, false locking is difficult and unlikely to occur and if it does occur such false locking can be easily released. Particularly, the PLL circuit of the present invention is very suitable for use with the recording and reproducing apparatus for producing information of burst-shape, data communication and similar applications.

Also, since the waveform equalization characteristic can be automatically varied by the VCO control voltage, which corresponds to the relative speed between the tape and the head in response to the relative speed in the high speed playback mode and the variable speed playback mode, it is possible to decrease the error rate of the data.

Although the invention has been described with respect to preferred embodiments, it is not to be so limited as changes and modifications can be made which are within the full intended scope of the invention as defined by the appended claims.

What is claimed is:

1. Apparatus for reproducing a digital signal comprising: a phase locked loop circuit means supplied with a reproduced signal and generating a clock signal; a detecting means for detecting the level of said reproduced signal; and a control means for controlling a feedback loop of said phase locked loop circuit means in response to an output signal of said detecting means, and in which said phase locked loop circuit means comprises an oscillator means which has an oscillation frequency which is varied by a control signal, a phase comparing means for phase-comparing said reproduced signal and an output from said oscillator means, a charge pump circuit means connected to an output of said phase comparing means, and a low pass first filter means connected to said charge pump circuit means for generating said control signal, and said control means controls the operation of said charge pump circuit means in response to the output of said detecting means.

2. Apparatus for reproducing a digital signal according to claim 1, in which said low pass first filter means includes an amplifying means of an integration type.

3. Apparatus for reproducing a digital signal according to claim 1, in which said detecting means comprises an envelope detecting means for detecting an envelope of said reproduced signal, a comparator means connected to an output of said envelope detecting means and a second filter means connected to said comparator means for removing noise.

4. Apparatus for reproducing a digital signal according to claim 1, further comprising a variable waveform equalization means which is supplied with said reproduced signal and supplying an output signal to said phase locked loop circuit means and the frequency characteristic of said variable waveform equalization thereof is varied by said control signal.

5. Apparatus for reproducing a digital signal according to claim 1, further comprising a rotary head means for reproducing a digital signal recorded on a tape and generating said reproduced signal, a motor means for driving said rotary head means so that it rotates, and a motor driving means for controlling the rotation of said motor means with said control signal such that when the tape is transported at high speed, the relative speed between said tape and said rotary head means is equal to the relative speed during the normal playback mode.

6. Apparatus for reproducing digital signals from magnetic tape comprising a rotary head for reproducing digital data from said tape, a motor means for driving said rotary head, a motor drive means supplying an output to said motor, a switch means connected to said motor drive means and in a first position supplying a normal speed signal thereto and in a second position supplying a high speed signal thereto, a comparing circuit connected to said switching means to supply said high speed signal, a phase locked loop circuit receiving an output signal from said rotary head and including a voltage controlled oscillator and a phase comparing data extracting circuit which receives an input from said voltage controlled oscillator, a charge pump circuit connected to receive the output of said phase comparing data extracting circuit, a first low pass filter receiving the output of said charge pump circuit and supplying an input to said voltage controlled oscillator, and a second low pass filter receiving the output of said first low pass filter and supplying an input to said comparing circuit.

7. Apparatus according to claim 6 including a variable waveform equalization means and a wave shaping means connected between said rotary head and said phase comparing data extracting circuit, and a control signal generating means receiving the output of said second low pass filter and supplying an input to said variable waveform equalization means.

8. Apparatus according to claim 7 including a high-speed envelope detecting means receiving the output of said rotary head, a tracking comparator receiving the output of said high speed envelope detecting means, and a random walk filter receiving the output of said tracking comparator means and an output from said voltage variable oscillator and supplying an input to said charge pump circuit.

* * * * *